United States Patent
Furukawa et al.

(10) Patent No.: US 8,264,438 B2
(45) Date of Patent: Sep. 11, 2012

(54) LIQUID CRYSTAL DISPLAY DEVICE, MOBILE ELECTRONIC APPARATUS, IN-VEHICLE ELECTRONIC APPARATUS

(75) Inventors: Tomoo Furukawa, Matsusaka (JP);
Kazuyoshi Fujioka, Higashiosaka (JP);
Katsuya Ogawa, Matsusaka (JP);
Masaaki Saitoh, Taki-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 824 days.

(21) Appl. No.: 12/303,836

(22) PCT Filed: Jul. 24, 2007

(86) PCT No.: PCT/JP2007/064504
§ 371 (c)(1),
(2), (4) Date: Dec. 8, 2008

(87) PCT Pub. No.: WO2008/035505
PCT Pub. Date: Mar. 27, 2008

(65) Prior Publication Data
US 2010/0134394 A1    Jun. 3, 2010

(30) Foreign Application Priority Data
Sep. 19, 2006 (JP) .............................. 2006-253518

(51) Int. Cl.
*G09G 3/36* (2006.01)
*G02F 1/1335* (2006.01)
*C09K 19/02* (2006.01)

(52) U.S. Cl. ...................... 345/89; 349/119; 349/193

(58) Field of Classification Search .................. 349/129, 349/127, 119, 114, 98, 77, 38, 138–139, 349/193; 345/87–90, 102, 173, 55; 359/291, 359/263, 238, 294; 701/200; 348/744
See application file for complete search history.

(56) References Cited

U.S. PATENT DOCUMENTS
6,690,499 B1 * 2/2004 Larsen et al. ................. 359/238
(Continued)

FOREIGN PATENT DOCUMENTS
JP    2004-246312    9/2004
(Continued)

OTHER PUBLICATIONS

Supplementary European Search Report mailed Jul. 2, 2010 in corresponding EP application 07791229.3.
(Continued)

*Primary Examiner* — Quan-Zhen Wang
*Assistant Examiner* — Lin Li
(74) *Attorney, Agent, or Firm* — Nixon & Vanderhye P.C.

(57) ABSTRACT

A liquid crystal display device has a vertical alignment type liquid crystal panel. The vertical alignment type liquid crystal panel is provided with an active matrix substrate whereupon a light reflection pixel electrode for reflecting light and a light transmission pixel electrode for transmitting light are provided in each pixel section; a counter electrode substrate; and a liquid crystal layer made of a liquid crystal material having negative dielectric anisotropy. The counter electrode substrate includes a convex section so that the liquid crystal layer in the light reflection section has the thickness thinner than that in the liquid crystal layer of the light transmission section. A liquid crystal panel driving device carries out gray scale transition enhancement processing in which the input gray scale is corrected in accordance with gray scale transition.

19 Claims, 10 Drawing Sheets

U.S. PATENT DOCUMENTS

| | | |
|---|---|---|
| 6,788,375 B2 | 9/2004 | Ogishima et al. |
| 2002/0080320 A1 | 6/2002 | Suzuki et al. |
| 2004/0125064 A1 | 7/2004 | Adachi et al. |
| 2005/0018118 A1* | 1/2005 | Kubo et al. .................. 349/119 |
| 2005/0151907 A1* | 7/2005 | Maeda .......................... 349/129 |
| 2005/0174528 A1* | 8/2005 | Kubo et al. .................. 349/193 |
| 2005/0237455 A1 | 10/2005 | Fujioka et al. |
| 2005/0237463 A1* | 10/2005 | Kubo ........................... 349/139 |
| 2006/0050209 A1 | 3/2006 | Higa |
| 2006/0197894 A1 | 9/2006 | Higa et al. |
| 2006/0244702 A1* | 11/2006 | Yamazaki et al. ............. 345/89 |
| 2007/0046606 A1* | 3/2007 | Kim et al. ...................... 345/90 |
| 2007/0055442 A1* | 3/2007 | Kawakami et al. ........... 701/208 |
| 2007/0222731 A1* | 9/2007 | Adachi et al. .................. 345/89 |

FOREIGN PATENT DOCUMENTS

| | | |
|---|---|---|
| JP | 2006-072086 | 3/2006 |

OTHER PUBLICATIONS

International Search Report for PCT/JP2007/064504, mailed Oct. 9, 2007.

* cited by examiner

LIQUID CRYSTAL DISPLAY DEVICE, MOBILE ELECTRONIC APPARATUS, IN-VEHICLE ELECTRONIC APPARATUS

This application is the U.S. national phase of International Application No. PCT/JP2007/064504, filed 24 Jul. 2007, which designated the U.S. and claims priority to Japanese Patent Application No. 2006-253518, filed 19 Sep. 2006, the entire contents of each of which are hereby incorporated by reference.

TECHNICAL FIELD

The present invention refers to a liquid crystal display device of a vertical alignment (VA) type that carries out a display in a transmission mode and a reflective mode.

BACKGROUND ART

Patent document 1 discloses an arrangement of a liquid crystal display device of a vertical alignment type (see FIG. 12). As shown in FIG. 12, a liquid crystal display device 303 has (i) a TFT substrate 251 on which a plurality of thin film transistors (TFTs) are formed in pixels, respectively and (ii) an counter substrate 252, which is provided so as to face the TFT substrate 251 via a liquid crystal layer 204. In addition to the TFTs and wiring 211, the TFT substrate 251 has (a) a transparent electrode 214 that is formed on a glass substrate 202 via a protective insulation film 217, and (b) a reflection electrode 215 that is formed on the glass substrate 202 via the protective insulation film 217 and an interlayer insulation film 222. The interlayer insulation film 222 is provided for adjusting the thickness of the liquid crystal layer in a reflection region H. The reflection electrode 215, transparent electrode 214, and interlayer insulation film 222 are covered with a vertical alignment film 218 (made of a material such as polyimide). In each of the pixels, a region where the interlayer insulation film 222 is not formed becomes a transmission region T, whereas a region where the interlayer insulation film 222 and the reflection electrode 215 are formed becomes the reflection region H. The reflection electrode 215 is made of a material, having a high reflectance, such as aluminum. The transparent electrode 214 is made of a material, having a high transmittance, such as ITO (indium tin oxide). Both the transparent electrode 214 and the reflection electrode 215 are connected to a drain electrode of each of the TFTs. As such, the driving of a TFT causes a target voltage to be applied to a transparent electrode 214 and a reflection electrode 215.

On the other hand, the counter substrate 252 has a color filter 221 and a transparent electrode (made of a material such as ITO), which is a counter electrode 219, on a glass substrate 201. The counter substrate 252 further has rivets 216 for controlling a direction of alignment regulation of liquid crystal molecules 203. The rivets 216 are provided in both the transmission region T and the reflection region H. The rivets 216 and the counter electrode 219 are covered with a vertical alignment film 218.

A liquid crystal layer 204 is made up of a liquid crystal composition sealed in a space between the TFT substrate 251 and the counter substrate 252. To outer surfaces of the glass substrates 201 and 202, polarization plates and phase difference compensation films, (not shown), are attached, respectively.

The liquid crystal display device 303 carries out a display, by (i) controlling, via the TFTs of the pixels, alignment directions of the liquid crystal molecules 203 in the reflection region H and the transmission region T, and (ii) changing, based on an electro-optic effect in the liquid crystal layer, an amount of light passing through the polarization plates.

However, the above liquid crystal display device causes a problem, as disclosed in Patent Document 1, that it is difficult to quicken a response time in the transmission region T. In view of this, the Patent Document 1 focuses attention on the fact that a response time of liquid crystal molecules is slow in specific parts (both end parts of the transparent region T, at which end parts the liquid crystal molecules unstably align) of the transparent region T, and blocks the light in the specific parts. That is, Patent Document 1 improves display quality, by blocking the light in the end parts of the transmission region T, so that the end parts do not contribute to a transmission display.

(Patent document 1)
Japanese Unexamined Patent Application Publication, *Tokukai*, No. 2005-331926 (published on Dec. 2, 2005)

DISCLOSURE OF INVENTION

However, Patent document 1 discloses an arrangement in which the light is blocked in the parts, in the transmission region, where the response time is slow. Thus, the arrangement is not for quickening the response time itself of the liquid crystal molecules in the transmission region. As such, there is a definite ceiling to the improvement in display quality of a moving image, in particular.

The present invention is made in the view of the problem, and an object of the present invention is to provide a liquid crystal display device having high display quality (in particular, display quality of a moving image).

In order to attain the object, a liquid crystal display device of the present invention comprises (i) an active matrix substrate on which a light reflection pixel electrode for reflecting light and a light transmission pixel electrode for transmitting light are formed in each pixel section, (ii) a counter electrode substrate, (iii) a vertical alignment type liquid crystal panel having a liquid crystal layer that is made of a liquid crystal material having a negative dielectric anisotropy, and (iv) a liquid crystal panel driving device for driving (applying to the liquid crystal panel, a signal electric potential corresponding to the input gray scale) the liquid crystal panel in accordance with an input gray scale, wherein: the counter electrode substrate includes a convex section in each pixel so that the liquid crystal layer in a light reflection section has a thickness thinner than that in a light transmission section; the liquid crystal layer of the light reflection section has an alignment state, and the liquid crystal layer of the light transmission section has an alignment state; and the liquid crystal panel driving device carries out gray scale transition enhancement processing (overdrive) in which the input gray scale is corrected in accordance with a gray scale transition. In the present invention, the "light reflection section" refers to a part of a region that contributes to an actual display, the region being a region where the light reflection pixel electrode is formed (a region where the counter electrode and the light reflection pixel electrode overlap each other). The "light transmission section" refers to a part of a region that contributes to an actual display, the region being a region where the light transmission pixel electrode is formed (a region where the counter electrode and the light transmission pixel electrode overlap each other).

First, the following description deals with a conventional liquid crystal display device 303 shown in FIG. 12. When a voltage is applied, a vertical alignment film 218 on a rivet 216 (protrusion for electric filed control) affects liquid crystal molecules 203a, in the vicinity of the rivet 216 of the light transmission section. In contrast, a vertical alignment film on an inclined surface 255 affects liquid crystal molecules 203b, in the vicinity of the inclined surface 255 of an interlayer insulation film 222. As such, liquid crystal molecules in the vicinity of a boundary between a light transmission section T and a light transmission section H are subjected to an alignment regulation force in a direction opposite to the alignment regulation of the liquid crystal molecules of the inner part of the light transmission section. This causes the alignment in the liquid crystal layer in the vicinity of the inclined surface 255 to block a response of a liquid crystal layer in the light transmission section T, when the voltage is applied in the liquid crystal display device 303 shown in FIG. 12. Due to this, there is an increase in a difference (a difference in silent time between the light reflection section and the light transmission section) between (i) time from the voltage application to the light reflection pixel electrode to start of the response of the light reflection section and (ii) time from the voltage application to the light transmission pixel electrode to start of the response of the light transmission section. There was a case where the difference was increased to be even a one frame or more.

Meanwhile, the gray scale transition enhancement processing (overdrive) is known as a high speed response technique designed for improving display quality of the liquid crystal. According to the technique, an appropriate enhancement signal is applied for a one frame period so that the liquid crystal is forced to respond within the one frame period. However, in the liquid crystal display device 303 shown in FIG. 12, the following problem is found that, due to the reason described above, the difference in the silent time between the light reflection section and the light transmission section is so large that the display quality cannot be improved even if the gray scale transition enhancement processing is carried out with respect to the liquid crystal display device 303.

That is, the light transmission section having long silent time slowly responds to a certain gray scale transition enhancement processing signal applied for a one frame period, whereas the light reflection section having short silent time quickly responds to the signal. On this account, if an input gray scale is corrected in accordance with the light transmission section having the long silent time, then the light reflection section having the short silent time excessively responds, thereby causing a problem such as white shining. On the other hand, if the input gray scale is corrected in accordance with the light reflection section having the short silent time, the silent time of the light transmission section does not change much. Thus, it is not possible to obtain an effect derived from the gray scale transition enhancement processing.

As such, with regard to the liquid crystal display device 303 shown in FIG. 12, there is no condition in which it is possible to carry out the gray scale transition enhancement processing which brings about an effect with respect to both the light transmissions section and the light reflection section. On this account, it is difficult for the liquid crystal display device 303 to have an improvement in the response time which improvement is derived from the gray scale transition enhancement processing. Thus, it was difficult to improve display quality of a moving image.

As such, in the present invention, the counter electrode substrate includes a convex section in each pixel so that (i) the liquid crystal layer in a light reflection section has a thickness thinner than that in a light transmission section and (ii) the liquid crystal layer in the light reflection section has an alignment state and the liquid crystal layer in the light transmission section has an alignment state. That is, by providing the convex section on the counter electrode substrate, instead of providing it in the active matrix substrate, the liquid crystal molecules in the vicinity of the boundary (the convex section of the inclined section) between the light transmission section and the light reflection section are arranged to be subjected to the alignment regulation force in the same direction as the alignment regulation in the light transmission section.

In a case where a voltage is applied to such a liquid crystal display device, alignment in the liquid crystal layer in the inclined part does not block a response of the liquid crystal layer in the light transmission section. As such, the difference in the silent time between the light transmission section and the light reflection section is reduced to a large degree. If the gray scale transition enhancement processing is further carried out, both the liquid crystal layers in the light transmission section and that in the light reflection section can respond to the gray scale transition enhancement processing signal applied for the one frame period. Thus, it is possible to carry out the effective gray scale transition enhancement processing (overdrive). That is, by optimizing a position and arrangement of the insulation film in contact with the liquid crystal layers in the light transmission section and the light reflection section, the alignment regulation direction is controlled so that each silent time of the light transmission section and the light reflection section is reduced. Then, the gray scale transition enhancement processing is carried out in this condition. This allows an improvement in the response time of the liquid crystal display device so as to improve the display quality (in particular, display quality of a moving image) of the liquid crystal display device.

In the liquid crystal display device of the present invention, the counter electrode substrate may include a protrusion for electric field control, which protrusion is made of an insulation layer, in a position where the counter electrode substrate and a center part of the light transmission pixel electrode overlap each other.

In the liquid crystal display device of the present invention, the counter electrode substrate may include a convex section, in a position where the counter electrode substrate and the light reflection pixel electrode overlap each other, and a protrusion for electric field control may be formed on the convex section. In this case, the convex section may include a surface that faces the active matrix substrate, and the protrusion for electric field control may be formed at a center of the surface.

In the liquid crystal display device of the present invention, it is preferable that the convex section have a taper shape (a structure having an inclined, lateral surface). This causes the liquid crystal molecule in the vicinity of the boundary between the light transmission section and the light reflection section to be more likely to receive the alignment regulation in a center part direction of the light transmission section. Thus, it is possible to further reduce the silent time of the light transmission section.

The liquid crystal display device of the present invention can be arranged such that the light transmission pixel electrode and the light reflection pixel electrode are subjected to patterning (i.e., the light transmission pixel electrode and the light reflection pixel electrode are electrically connected to each other and are independently formed). In this case, the liquid crystal layer includes an alignment state in which an alignment center is formed by an edge of the light transmission pixel electrode and the protrusion for electric field control, and a radial alignment is obtained, centered on the alignment center. Also, the liquid crystal layer includes an alignment state in which an alignment center is formed by an edge of the light reflection pixel electrode and the protrusion for electrical field control, and a radial alignment is obtained, centered on the alignment center.

In the liquid crystal display device of the present invention, it is preferable that the light reflection pixel electrode have an area larger than that of the light transmission pixel electrode.

In the liquid crystal display device of the present invention, a vertical alignment film may be formed on the counter electrode substrate.

In the liquid crystal display device of the present invention, each pixel may include a plurality of light transmission pixel electrodes and protrusions for electric field control that correspond to the light transmission pixel electrodes, respectively. Besides, each pixel may include a plurality of light reflection pixel electrodes and protrusions for electric field control that correspond to the light reflection pixel electrodes, respectively.

In the liquid crystal display device of the present invention, it is preferable that a difference between first silent time and second silent time fall within a half frame period, where the first silent time indicates time required from voltage application to the light reflection pixel electrode to start of a response of the light reflection section, and the second silent time indicates time required from voltage application to the light transmission pixel electrode to start of a response of the light transmission section.

It is preferable that in the liquid crystal display device of the present invention, the gray scale transition enhancement processing be carried out such that the light reflection section completes its response within a one frame period.

A mobile electronic apparatus and an in-vehicle electronic apparatus of the present invention include the liquid crystal display device, respectively.

As described above, according to the liquid crystal display device of the present invention, the difference in the silent time between the light transmission section and the light reflection section can be reduced to a large degree by the counter electrode substrate including the convex section (step section). As such, the effective gray scale transition enhancing processing (overdriving) can be carried out. This allows the improvement in the response time of the liquid crystal display device and the improvement in the display quality (in particular, the display quality of a moving image) thereof.

BRIEF DESCRIPTION OF REFERENCE NUMERALS

Figure 1:
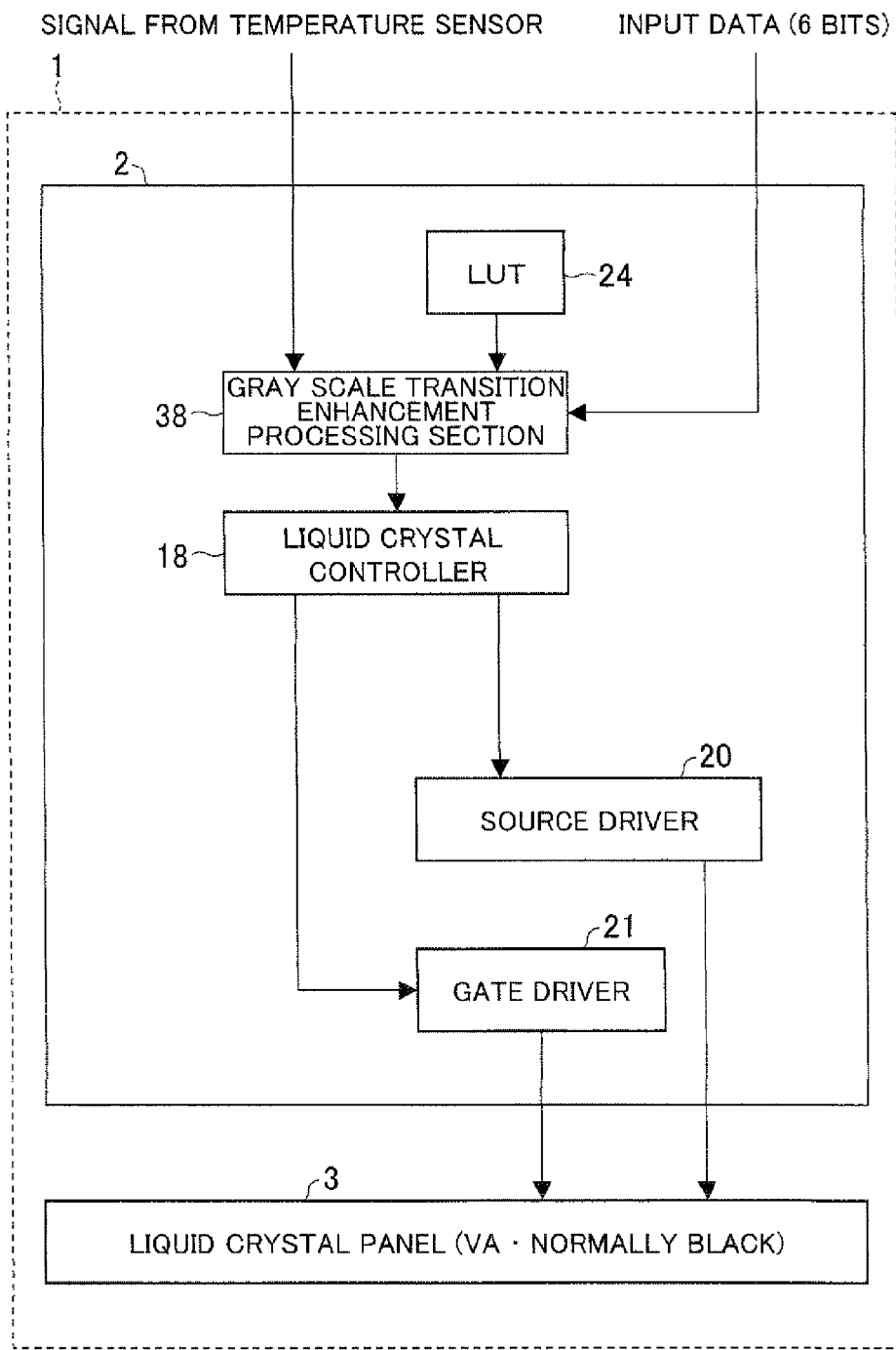
FIG. 1 is a block diagram for showing an arrangement of an exemplary liquid crystal display device of an embodiment in accordance with the present invention.

1. Liquid crystal display device
2. Liquid crystal panel driving device
3. Liquid crystal
18. Liquid crystal controller
20. Source driver
24. LUT
30. Active matrix substrate
31. Counter electrode substrate
32. Liquid crystal layer
34. Convex section
35$a$, 35$b$. Light reflection pixel electrode
36$a$, 36$b$. Light transmission pixel electrode
38. Gray scale transition enhancement processing section
45$a$, 45$b$. Rivet
46$a$, 46$b$. Rivet
66. Counter electrode
77. TFT

BEST MODE FOR CARRYING OUT THE INVENTION

One embodiment of the present invention is described as follows, with reference to FIGS. 1 through 11.

As shown in FIG. 1, a liquid crystal display device 1 of the present embodiment includes a normally black liquid crystal panel 3 of a vertical alignment type and a liquid crystal panel driving device 2 for driving the liquid crystal panel 3.

The liquid crystal panel driving device 2 includes a gray scale transition enhancement processing section 38, a look up table (LUT) 24, a liquid crystal controller 18, a source driver 20, and a gate driver 21.

Note that each section of the gray scale transition enhancement processing section 38 and the liquid crystal controller 18 can be realized by a processor such as ASIC. In the liquid crystal panel 3, each pixel includes two light reflection pixel electrodes and two light transmission pixel electrodes. This causes alignment states which vary in accordance with the four pixel electrodes.

The liquid crystal controller 18 controls the source driver 20 and the gate driver 21. The source driver 20 includes a DAC circuit (not shown). The DAC circuit converts, into an analogue output voltage, a gray scale (output gray scale) outputted from the liquid crystal controller 18. The source driver 20 and the gate driver 21 drive source lines and gate lines, respectively, in the liquid crystal panel 3. This causes the output voltage to be written into the pixels that are provided, in a matrix manner, in the vicinity of intersections of the source lines and the gate lines, respectively, thereby allowing the liquid crystal panel 3 to carry out a display.

The gray scale transition enhancement processing section 38 carries out a gray scale transition enhancement processing, on the presumption that a response is carried out within a one frame. In the gray scale transition enhancement processing, the gray scale transition enhancement processing section 38 refers to the LUT 24, and compares two kinds of data, i.e., (i) data of a current frame which does not go through a frame memory (not shown) and (ii) data of a previous frame from a frame memory, the previous frame coming a one frame earlier than the current frame. That is, a current output gray scale is determined based on a previous input gray scale and a current input gray scale. For example, if a previous input gray scale is 0 and a current input gray scale is 24 gray scale, then 37 gray scale is outputted. Note that the liquid crystal display device 1 of the present embodiment uses, as the LUT 24, a table causing the light reflection section to respond within a one frame period. This is based on the following fact. Namely, the light reflection section responds excessively (white shining) under the condition that the light transmission section responds within a one frame period, because the light transmission section responds more slowly than the light reflection section, due to a difference in thicknesses of their liquid crystal layers. Note that, in a case where the gray scale transmission enhancement section 38 is arranged so as to externally receive a signal from a temperature sensor (see FIG. 1), it can carry out gray scale transition enhancement processing in accordance with a temperature. In this case, it is preferable to prepare LUTs for respective temperatures.

The following description deals with the liquid crystal panel 3 of the present embodiment.

Figure 2:
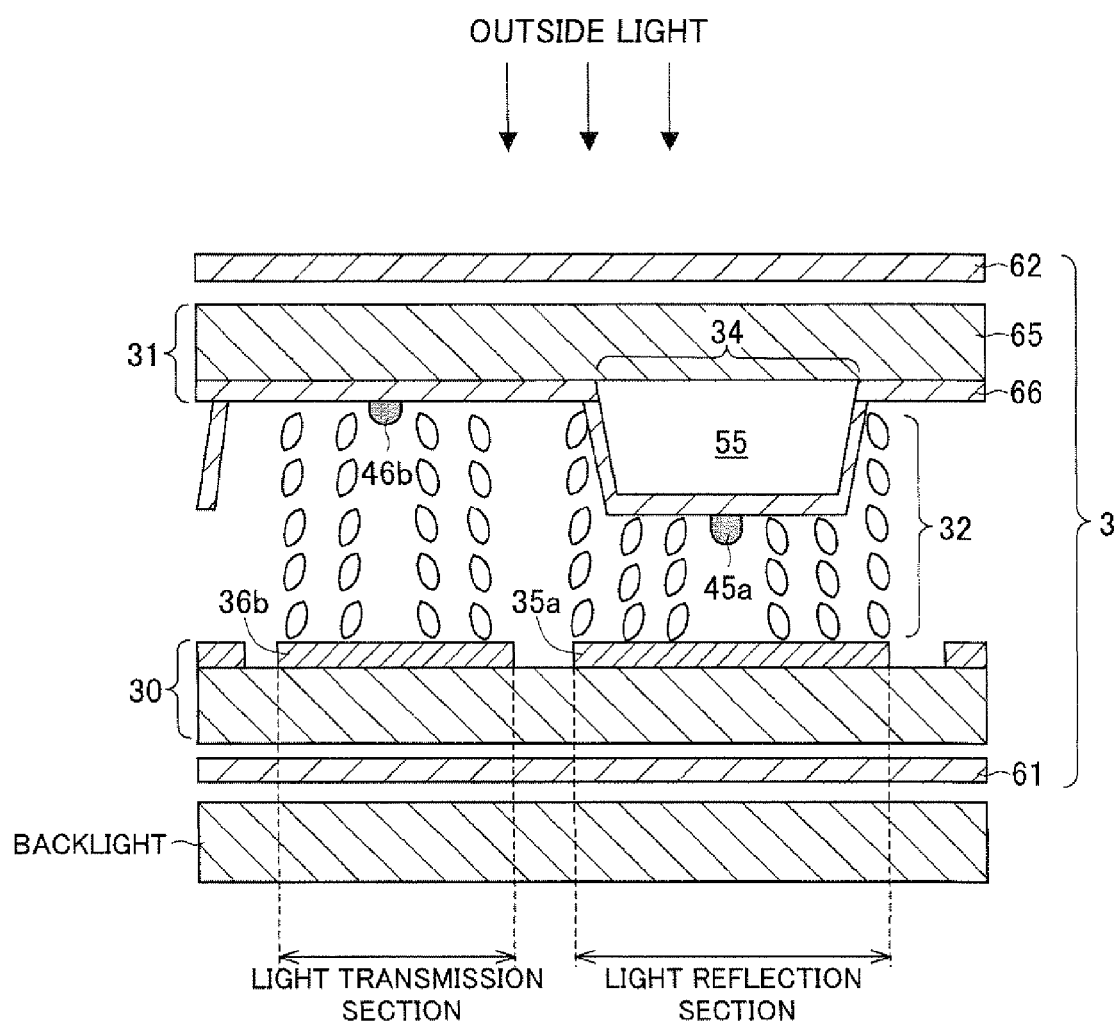
FIG. 2 is a cross-sectional view for showing a liquid crystal panel used in the exemplary liquid crystal display device of the embodiment in accordance with the present invention.

The liquid crystal panel 3 is a liquid crystal panel that carries out, in combination with a backlight, a display in a transmission mode and a reflection mode. As shown in FIG. 2, the liquid crystal panel 3 includes two polarization plates 61 and 62, an active matrix substrate 30, a counter electrode substrate 31, and a liquid crystal layer 32. In the liquid crystal panel 3, the polarization plate 61, the active matrix substrate 30, the liquid crystal layer 32, the counter electrode substrate 31, and the polarization plate 62 are provided in this order from a backlight 58 side. Though not being illustrated, a retardation film is provided, if necessarily.

Figure 3:
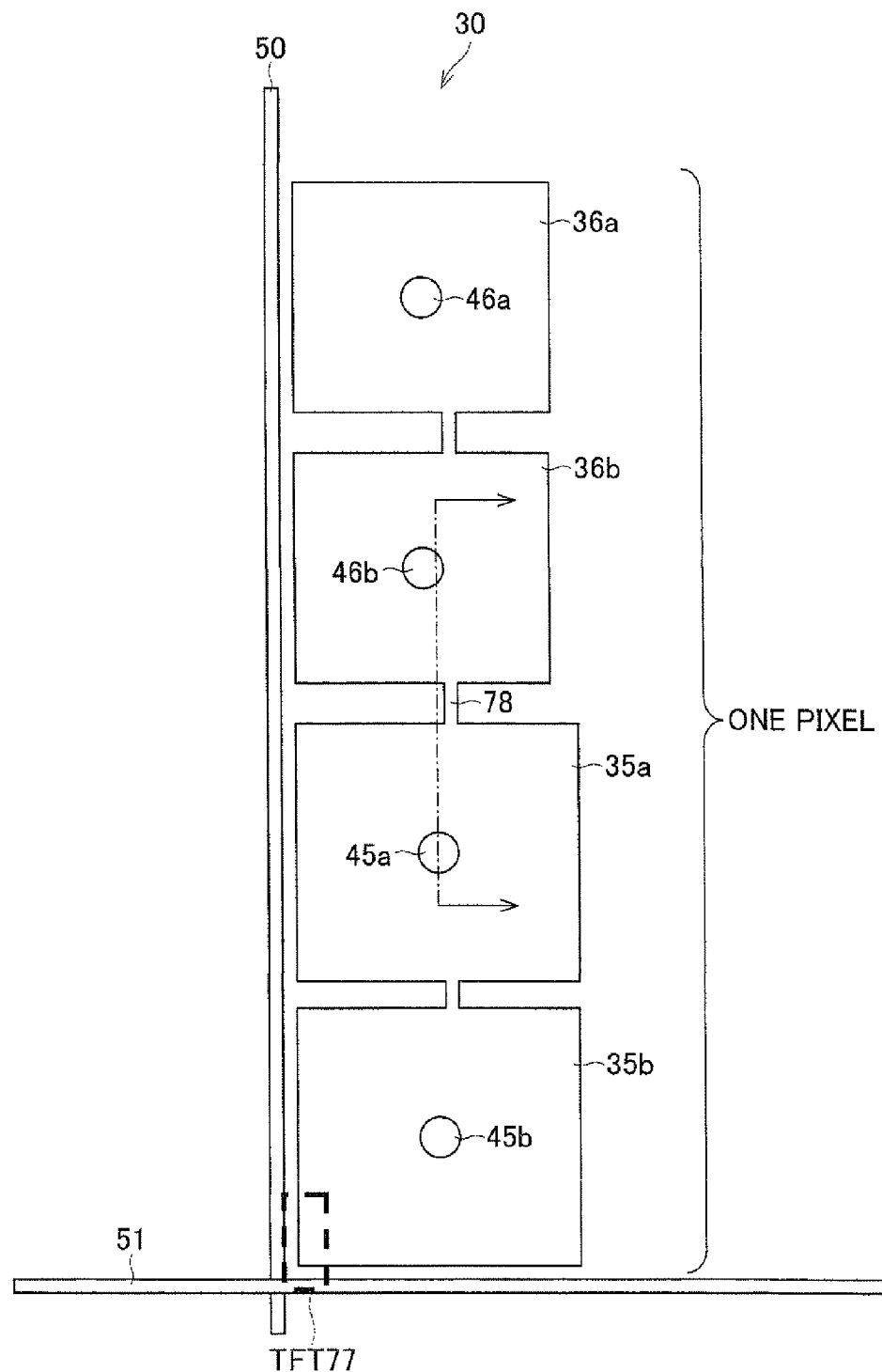
FIG. 3 is a plan view of the exemplary liquid crystal panel of the embodiment in accordance with the present invention, showing an arrangement of one pixel.

As shown in FIG. 3, the active matrix substrate 30 includes, in each pixel region, a TFT 77, a light reflection pixel electrode 35b, a light reflection pixel electrode 35a, a light transmission pixel electrode 36b, and a light transmission pixel electrode 36a. The TFT 77 is connected to a data signal line 50 and a scanning signal line 51 that are orthogonal to each other. The light reflection pixel electrode 35b, the light reflection pixel electrode 35a, the light transmission pixel electrode 36b, and the light transmission pixel electrode 36a are provided in a line, along the data signal line 50 (in the lengthwise direction of the drawing). The light reflection pixel electrode 35b is connected to the TFT 77 via a contact hole (not shown). FIG. 2 is a cross-sectional view taken on the dashed line in FIG. 3.

The light reflection pixel electrodes 35a and 35b and the light transmission pixel electrodes 36a and 36b are subjected to patterning so as to have rotational symmetry shapes, respectively, (square, circle, square with rounded corners, or the like). This causes formation of individual four pixel electrodes which are connected to each other via bridge wiring 78. By this, a signal electric potential applied to the data signal line 50 is written into each of the four individual pixel electrodes (the light reflection pixel electrodes 35a and 35b and the light transmission pixel electrodes 36a and 36b), via the TFT 77. The light reflection pixel electrodes are made of a material, having a high reflectance, such as aluminum, and the light transmission pixel electrodes are made of a material, having a high transmittance, such as ITO (Indium Tin Oxide).

The counter electrode substrate 31 includes a color filter substrate 65, a counter electrode 66 formed on the color filter substrate 31, and a vertical alignment film (not shown) that covers the counter electrode 66. The counter electrode substrate 31 includes a convex section 34 in a position where the counter electrode substrate 31 and the light reflection pixel electrodes (35a and 35b) overlap each other. The convex section 34 is obtained by (i) providing, in the position where the counter electrode substrate 31 and the light reflection pixel electrodes overlap each other, a step member 55 (transparent resin such as acrylic resin), made from an insulation film, which projects toward the liquid crystal layer 32 and then (ii) forming the counter electrode 66 so that the counter electrode 66 covers the step member 55. The convex section 34 allows the liquid crystal layer in the light reflection section to be thinner than that in the light transmission section. As such, it is possible to set a difference in optical paths between the light reflection section and the light transmission section. Alternatively, the step member 55 can be provided for each of the light reflection pixel electrodes (35a and 35b) or can be provided to bridge the two light reflection pixel electrodes (35a and 35b) (the step member 55 can be provided to be shared by the two light reflection pixel electrodes 35a and 35b). Instead, the step member 55 can be provided so as to bridge light reflection pixel electrodes of a plurality of pixels (the step member 55 can be provided to be shared by the light reflection pixel electrodes of the plurality of pixels).

The convex section 34 has a taper shape and a surface that faces the active matrix substrate 30. At the center of the surface, rivets 45a and 45b (protrusions for electric field control) are provided. Also, the counter electrode substrate 31 includes rivets 46a and 46b (protrusions for electric field control) in a position where the counter electrode substrate 31 and center parts of the light transmission pixel electrodes (36a and 36b) overlap (face) each other, respectively.

The liquid crystal layer 32 is made of a liquid crystal material having a negative dielectric anisotropy. When no voltage is applied to the liquid crystal layer 32, liquid crystal molecules align substantially vertical to the substrates. Whereas, when a voltage is applied to the liquid crystal layer 32, the liquid crystal molecules radially align, centered on a rivet (protrusion for electric field control).

Here, the following description explains a case where the gray scale transition enhancement processing is performed to the liquid crystal panel 3.

Figure 4:
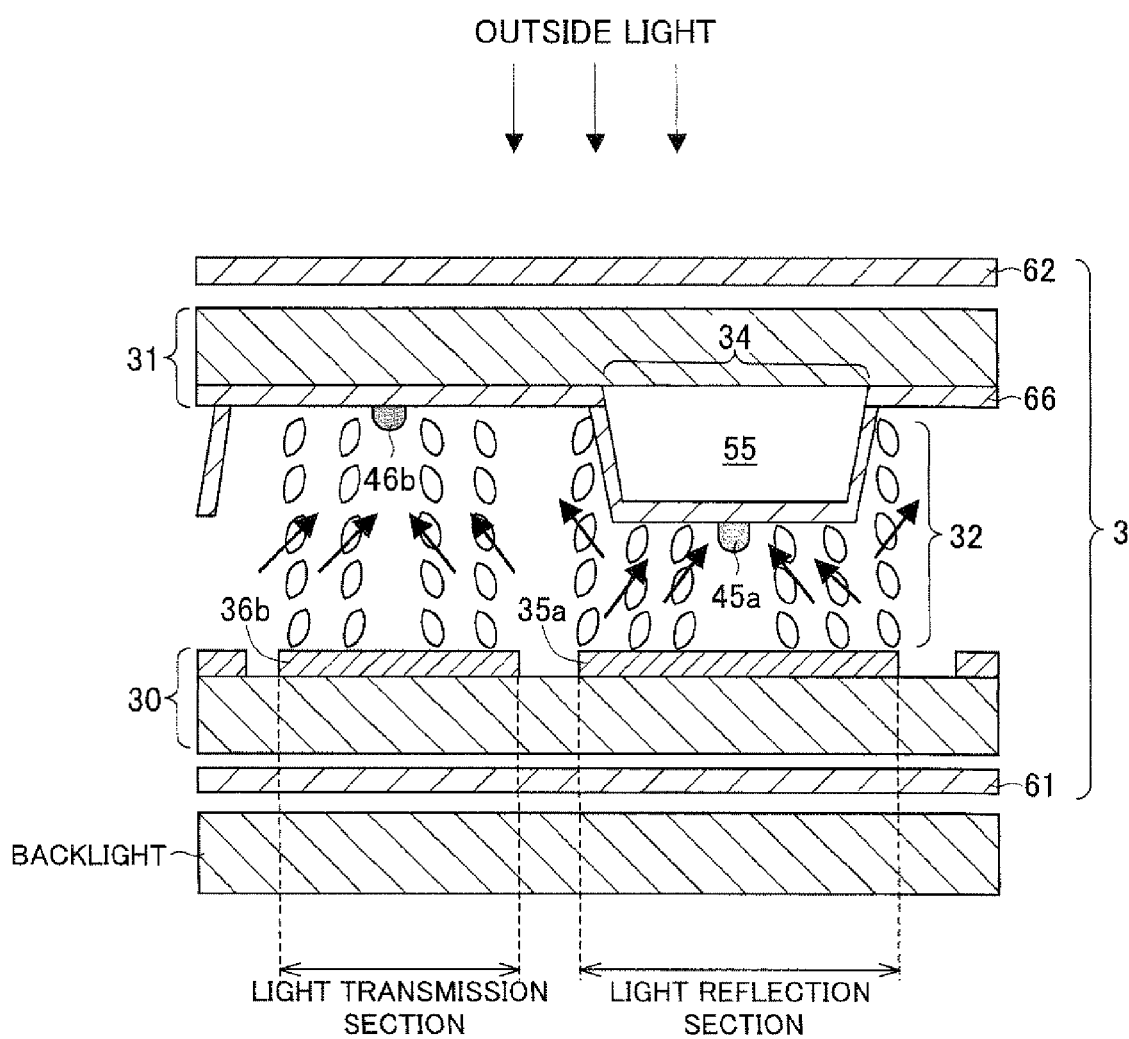
FIG. 4 is a cross-sectional view of the exemplary liquid crystal panel of the embodiment in accordance with the present invention, showing an alignment state.
Figure 5:
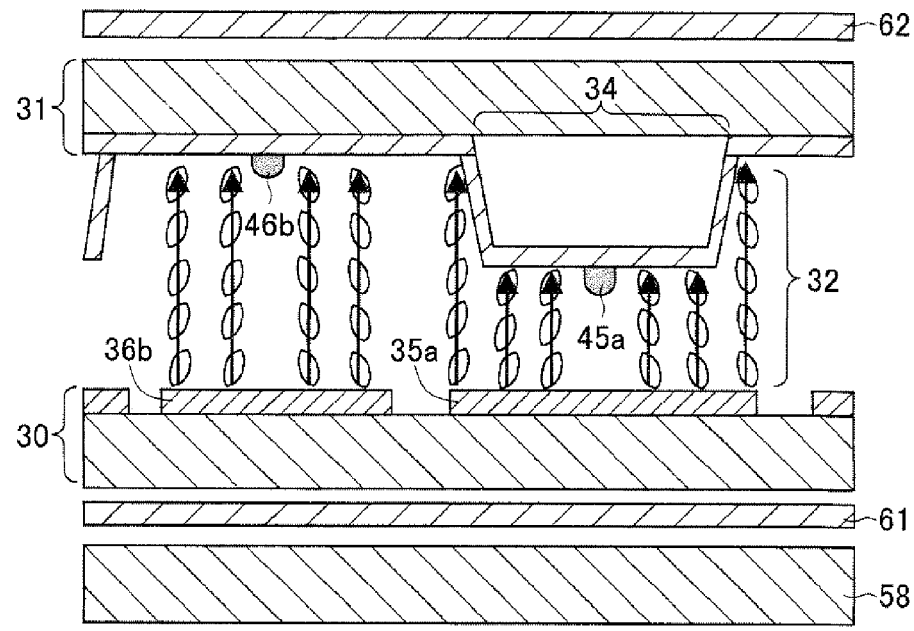
FIG. 5 is a cross-sectional view of the exemplary liquid crystal panel of the embodiment in accordance with the present invention, showing an alignment state.
Figure 6:
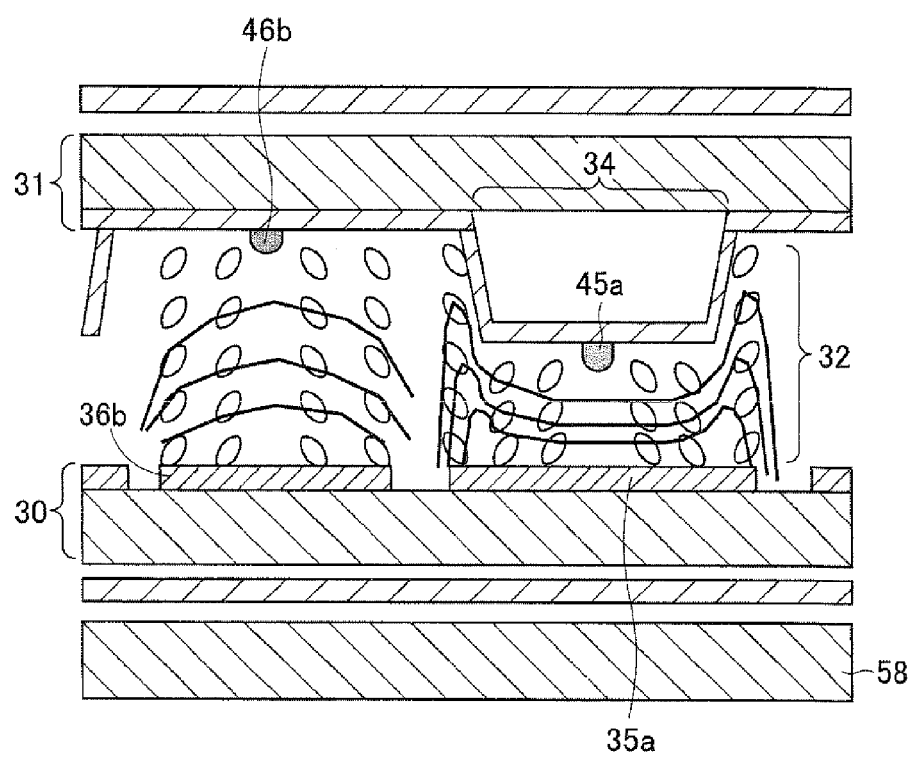
FIG. 6 is a cross-sectional view of the exemplary liquid crystal panel of the embodiment in accordance with the present invention, showing an alignment state.

As shown in FIG. 4, in the present liquid crystal panel, the rivet 46b (protrusion for electric filed control) affects the determination of an alignment direction in the most part of the liquid crystal layer in the light transmission section. In contrast, the alignment film on the inclined surface of the convex section 34 affects the determination of the alignment direction of the liquid crystal molecules in the liquid crystal layer in the vicinity of the boundary between the light transmission section and the light reflection section. That is, in the light transmission section of the liquid crystal panel 3, the liquid crystal molecules of an inner part of the liquid crystal layer are subjected to alignment regulation in the same direction as an end part of the liquid crystal layer (vicinity of the boundary between the light transmission section and the light reflection section) (see FIG. 5).

Figure 7:
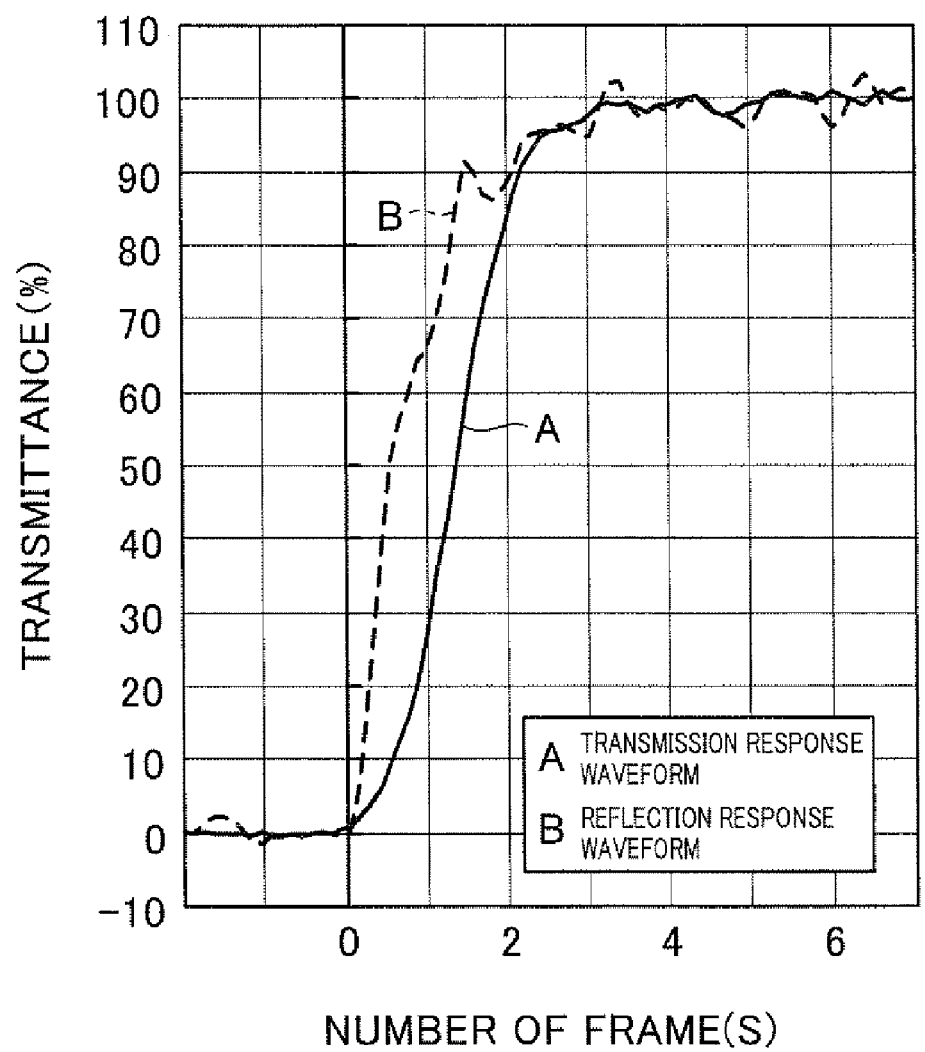
FIG. 7 is a graph for showing a response characteristic of the exemplary liquid crystal display device of the embodiment in accordance with the present invention.

As such, in a case where a voltage is applied to the liquid crystal panel 3 (see FIG. 6), the liquid crystal layer in the light reflection section, which has a thickness thinner than the light transmission section, responds earlier so that the liquid crystal molecules radially align. Then, the liquid crystal layer in the light transmission section responds to the applied voltage. As described above, in the light transmission section, the liquid crystal molecules of the inner part of the liquid crystal layer are subjected to the alignment regulation in the same direction as the end part of the liquid crystal layer. Thus, the liquid crystal layer in the light transmission section quickly responds to the applied voltage. FIG. 7 shows response waveform at this time. It is clear from a comparison between graphs A in FIG. 7 and in FIG. 11 (described later) that the silent time of the transmission section is reduced to a large degree and that the time required for the light transmission section to reach a 90% response from the voltage application is reduced to a large degree.

According to the liquid crystal panel 3 of the present embodiment, there is thus no significant difference in the silent time between the light transmission section and the light reflection section. As such, it is possible to realize a liquid crystal display device capable of carrying out a high speed response caused by the gray scale transition enhancement processing, when the responses of the light transmission and the light reflection section are balanced out during the gray scale transition enhancement processing, by fitly adjusting a gray scale transition enhancement processing signal, with taking into consideration the difference in the liquid layer thicknesses of the light transmission section and the light reflection section.

COMPARATIVE EXAMPLE

The following description explains, as a comparative example, a case in which a voltage is applied to a liquid crystal panel in which an insulation layer for adjusting thicknesses of liquid crystal layers in a light transmission section and a light reflection section is provided on an active matrix substrate (a TFT substrate).

Figure 8:
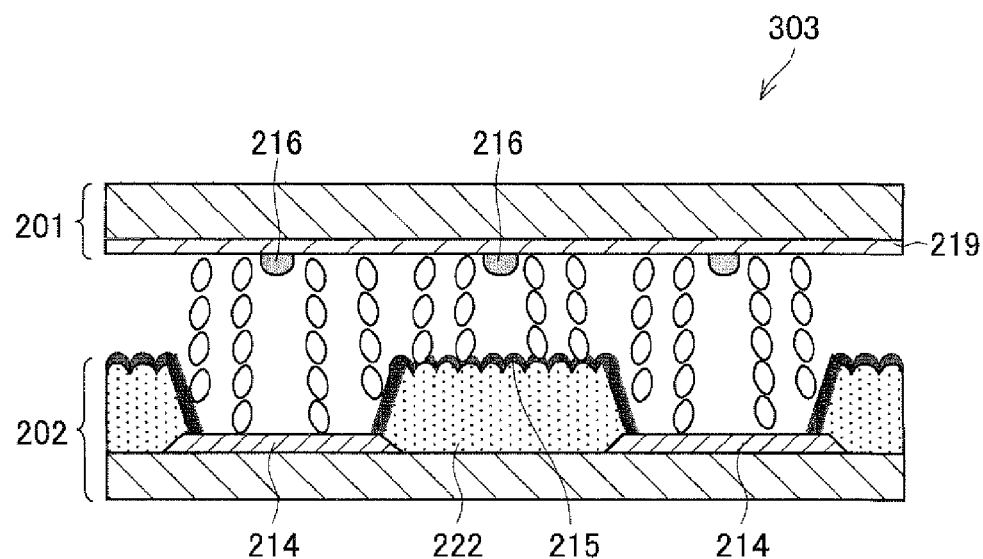
FIG. 8 is a cross-sectional view for showing an arrangement of a main part of a conventional, typical liquid crystal panel.
Figure 9:
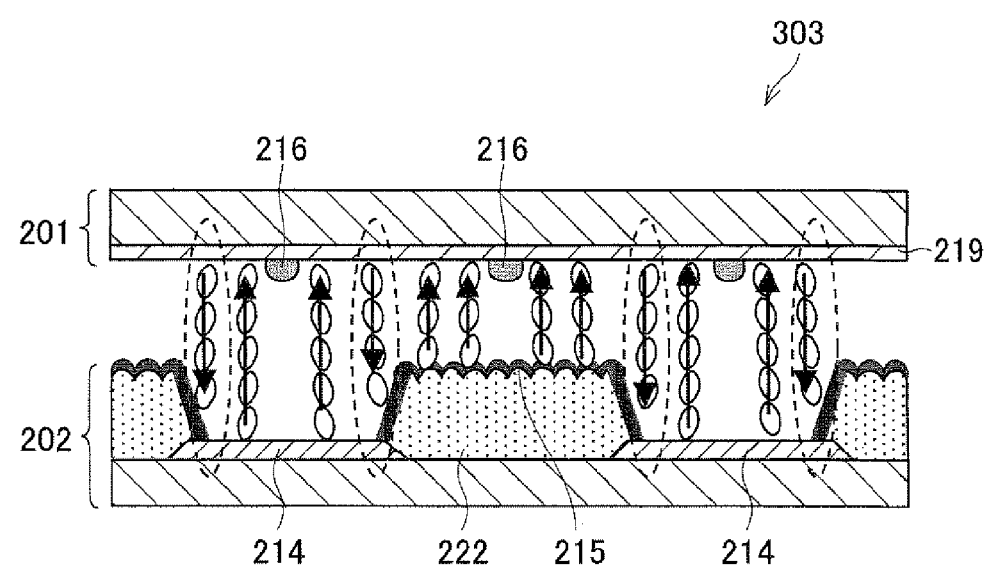
FIG. 9 is a cross-sectional view for showing an alignment state in the liquid crystal panel shown in FIG. 8.
Figure 10:
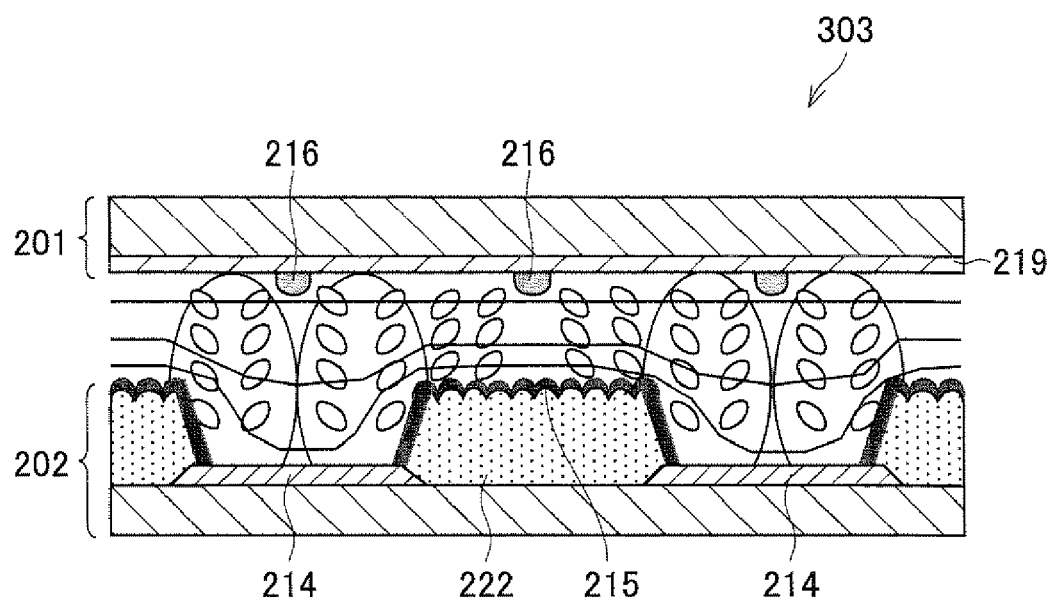
FIG. 10 is a cross-sectional view for showing an alignment state in the liquid crystal display panel shown in FIG. 8.

First, FIG. 8 shows a typical arrangement of a liquid crystal panel in accordance with a comparative example. As shown in FIG. 8, according to a liquid crystal panel 303, an active matrix substrate 202 has an insulation film 222 that has a taper shape and adjusts the film thickness of a liquid crystal layer. On the insulation film 222, a light reflection pixel electrode 215 is formed. In parts where no insulation film is formed, a light transmission pixel electrode 214 is formed.

In a liquid crystal panel 303, rivets 216 affect determination of an alignment direction in most part of the liquid crystal layer in the light transmission section. In contrast, an alignment film on an inclined surface of the insulation film 222 provided on the active matrix substrate 202 affects determination of an alignment direction in the liquid crystal layer in the vicinity of the boundary between the light transmission section and the light reflection section. That is, in the liquid crystal layer in the light transmission section of the liquid crystal panel 303, the liquid crystal molecules of an inner part of the liquid crystal layer are subjected to alignment regulation in a direction opposite to alignment regulation in an end part of the liquid crystal layer (vicinity of the boundary between the light transmission section and the light reflection section) (see FIG. 9).

Figure 11:
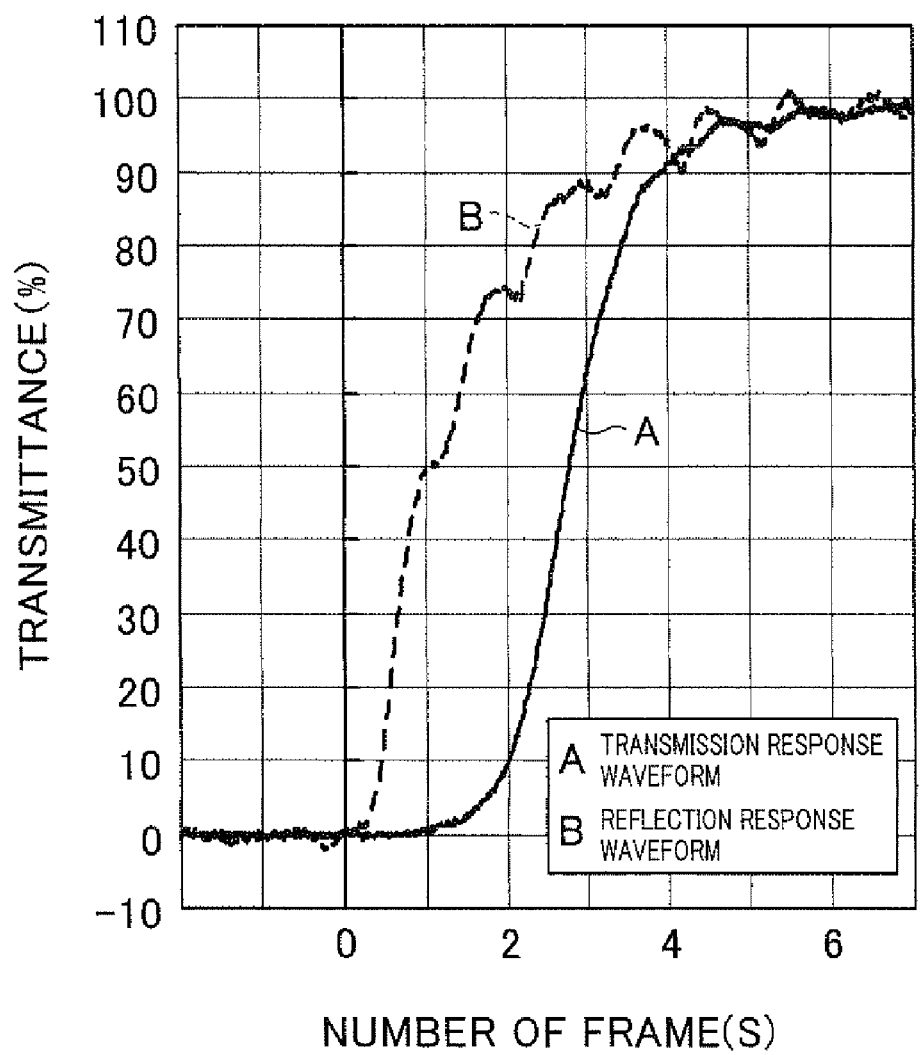
FIG. 11 is a graph for showing a response characteristic of a liquid crystal display device having the liquid crystal panel shown in FIG. 8.
Figure 12:
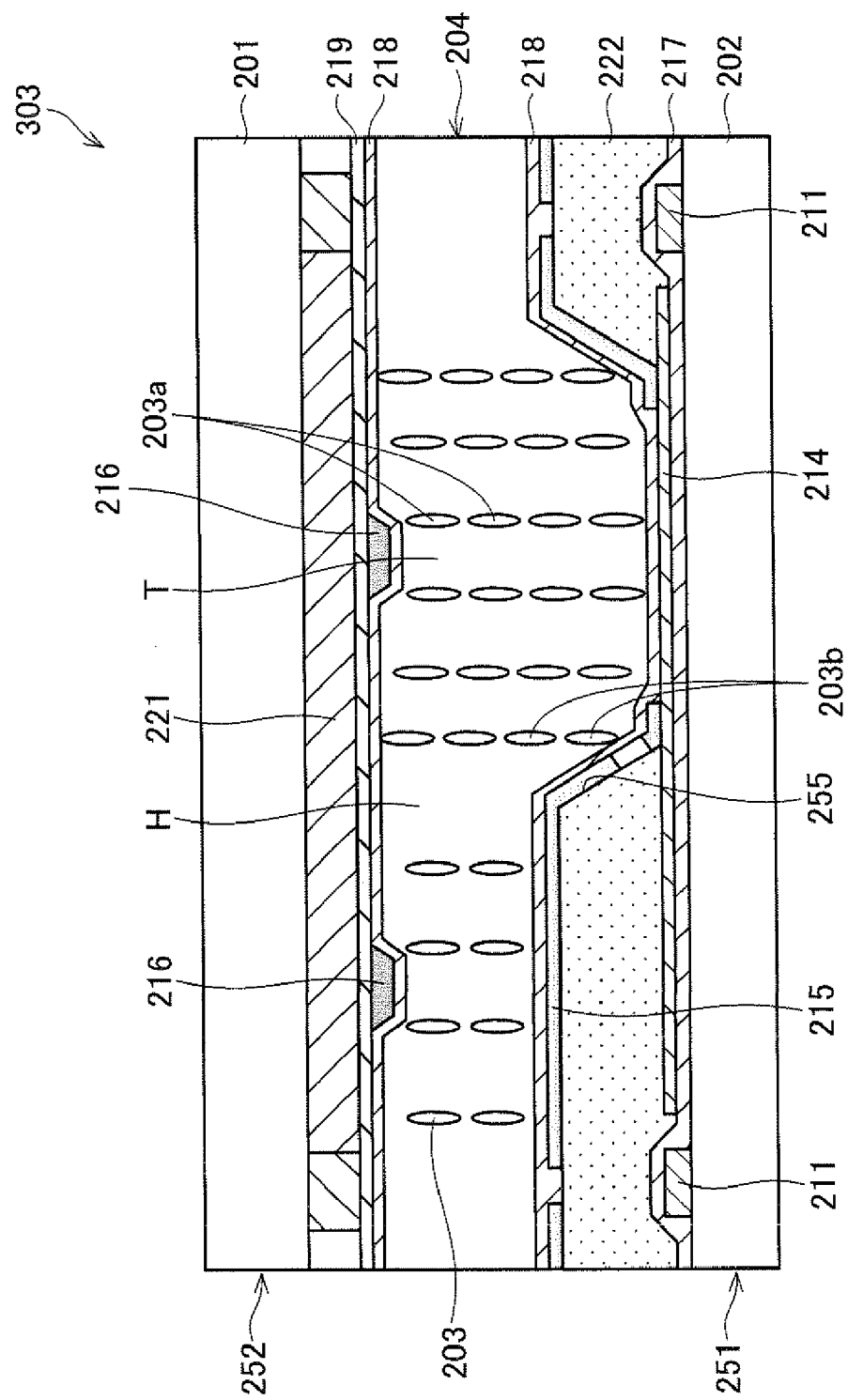
FIG. 12 is a cross-sectional view for showing an arrangement of the conventional liquid crystal display device.

In a case where a voltage is applied to the liquid crystal panel 303 (see FIG. 10), the liquid crystal layer in the light reflection section, which has a thickness thinner than the light transmission section, responds earlier so that the liquid crystal molecules radially align. Then, the liquid crystal layer in the light transmission section responds to the applied voltage. However, since the liquid crystal molecules of the inner part of the liquid crystal layer in the light transmission section are subjected to the alignment regulation in the direction opposite to the alignment regulation in the end part of the liquid crystal layer (vicinity of the boundary between the light transmission section and the light reflection section), conflict of the alignment states is caused between the inner part and the end part. As such, the liquid crystal layer in the light transmission section cannot respond to the applied voltage quickly. After the conflict of the alignment states disappears, the liquid crystal layer in the light transmission section begins to respond so that the liquid crystal molecules radially align. FIG. 11 shows response waveform at this time. As shown in FIG. 11, it is clear that the silent time from the start of the voltage application to the start of the response of the liquid crystal layer in the light transmission section lasts for a long period, i.e., for a one frame period or more.

As such, when the gray scale transition enhancement processing is carried out with respect to the liquid crystal panel 303 (when an excessive signal is applied for a one frame period so as to forcibly cause the liquid crystal layer to respond at high speed), the silent time of the light transmission section becomes long, so that the liquid crystal layer of the light transmission section hardly responds within a one frame period, after the excessive signal is applied. In contrast, the liquid crystal layer of the light reflection section responds to the applied signal after a one frame period elapses. This is because the liquid crystal layer of the light reflection section has a thickness thinner than the light transmission section and there is no response blocking factor.

As is clear from the above, it is the light reflection section that mainly responds to the gray scale transition enhancement processing signal (excessive signal) applied for the one frame period. In order for the light transmission section to be forced to respond, it is necessary to apply a remarkably large gray scale transition enhancement processing signal. However, note that, if such a large gray scale transition enhancement processing signal is applied so as to force the light transmission section to respond, then the light reflection section excessively responds. This causes the light reflection section to shine.

On the other hand, if a gray scale transition enhancement processing signal is applied so that the light reflection section does not excessively respond, then the light transmission section has no effect derived from the gray scale transition processing. As such, there is no condition (no gray scale transition enhancement processing signal) that can concurrently meet the requirements of the light transmission section and the light reflection section. Thus, it is not possible to realize the high speed response caused by the gray scale transition enhancement processing.

INDUSTRIAL APPLICABILITY

A liquid crystal display device of the present invention is suitably used in, for example, a mobile electronic apparatus or an in-vehicle electronic apparatus.

The invention claimed is:
1. A liquid crystal display device, comprising:
an active matrix substrate on which a light reflection pixel electrode for reflecting light and a light transmission pixel electrode for transmitting light are formed in each pixel section;
a counter electrode substrate;
a vertical alignment type liquid crystal panel having a liquid crystal layer that is made of a liquid crystal material having a negative dielectric anisotropy; and a liquid crystal panel driving device for driving the liquid crystal panel in accordance with an input gray scale,
wherein:
the counter electrode substrate includes a convex section in said each pixel so that the liquid crystal layer in a light reflection section has a thickness thinner than that in a light transmission section; the liquid crystal layer in the light reflection section has an alignment state, and the liquid crystal layer in the light transmission section has an alignment state; and the liquid crystal panel driving device carries out gray scale transition enhancement processing in which the input gray scale is corrected in accordance with a gray scale transition; and
wherein the gray scale transition enhancement processing is carried out so as to adapt to a response of the light reflection section faster than a response of the light transmission section due to difference in thickness of the liquid crystal layer.

2. The liquid crystal display device as set forth in claim 1, wherein the counter electrode substrate has a protrusion for electric field control, in a position where the counter electrode substrate and a center part of the light transmission pixel electrode overlap each other.

3. The liquid crystal display device as set forth in claim 2, wherein the light transmission pixel electrode is subjected to patterning.

4. The liquid crystal display device as set forth in claim 3, wherein the liquid crystal layer includes an alignment state in which an alignment center is formed by an edge of the light transmission pixel electrode and the protrusion for electric field control, and a radial alignment is obtained, centered on the alignment center.

5. The liquid crystal display device as set forth in claim 2, wherein said each pixel includes a plurality of light transmission electrodes and protrusions for electrical field control that correspond to the light transmission pixel electrodes, respectively.

6. The liquid crystal display device as set forth in claim 1, wherein:
the counter electrode substrate includes the convex section, in a position where the counter electrode substrate and the light reflection pixel electrode overlap each other; and
a protrusion for electric field control is formed on the convex section.

7. The liquid crystal display device as set forth in claim 6, wherein:
the convex section has a surface that faces the active matrix substrate; and
the protrusion for electric field control is formed at a center of the surface.

8. The liquid crystal display device as set forth in claim 6, wherein the light reflection pixel electrode is subjected to patterning.

9. The liquid crystal display device as set forth in claim 8, wherein the liquid crystal layer includes an alignment state in which an alignment center is formed by an edge of the light reflection pixel electrode and the protrusion for electrical field control, and a radial alignment is obtained, centered on the alignment center.

10. The liquid crystal display device as set forth in claim 6, wherein said each pixel includes a plurality of light reflection pixel electrodes and protrusions for electrical field control that correspond to the light reflection pixel electrodes, respectively.

11. The liquid crystal display device as set forth in claim 1, wherein the convex section has a taper shape.

12. The liquid crystal display device as set forth in claim 1, wherein the light reflection pixel electrode has an area larger than that of the light transmission pixel electrode.

13. The liquid crystal display device as set forth in claim 1, wherein a vertical alignment film is formed on the counter electrode substrate.

14. The liquid crystal display device as set forth in claim 1, wherein:
a difference between first silent time and second silent time falls within a half frame period, where the first silent time indicates time required from voltage application to the light reflection pixel electrode to start of a response of the light reflection section, and the second silent time indicates time required from voltage application to the light transmission pixel electrode to start of a response of the light transmission section.

15. The liquid crystal display device as set forth in claim 1, wherein the gray scale transition enhancement processing is carried out such that the light reflection section completes its response within a one frame period.

16. A mobile electronic apparatus, comprising a liquid crystal display device as set forth in claim 1.

17. An in-vehicle electronic apparatus, comprising a liquid crystal display device as set forth in claim 1.

18. The liquid crystal display device of claim 1, wherein the gray scale transition enhancement processing is carried out so that a current input gray scale is corrected based on a previous input gray scale and the current input gray scale.

19. The liquid crystal display device of claim 18, wherein the current input gray scale is corrected to be higher when the current input gray scale is higher than the previous input gray scale.

* * * * *